United States Patent
Bhupati et al.

(10) Patent No.: US 12,242,840 B2
(45) Date of Patent: Mar. 4, 2025

(54) REINFORCEMENT LEARNING FOR CONTROLLING SOFTWARE UPDATE TIMING

(71) Applicant: Microsoft Technology Licensing, LLC, Redmond, WA (US)

(72) Inventors: Dhirendra Kumar Bhupati, Sammamish, WA (US); Johnny Sterling Campbell, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 141 days.

(21) Appl. No.: 18/131,323

(22) Filed: Apr. 5, 2023

(65) Prior Publication Data
US 2024/0338193 A1     Oct. 10, 2024

(51) Int. Cl.
| | |
|---|---|
| G06F 8/65 | (2018.01) |
| G06F 8/33 | (2018.01) |
| G06F 9/445 | (2018.01) |
| G06F 9/455 | (2018.01) |
| G06N 3/02 | (2006.01) |
| G06N 20/00 | (2019.01) |

(52) U.S. Cl.
CPC ..................... G06F 8/65 (2013.01)

(58) Field of Classification Search
CPC .... G06F 8/65; G06F 8/34; G06F 8/38; G06N 5/01; G06N 3/08; G06N 20/00
See application file for complete search history.

(56) References Cited

U.S. PATENT DOCUMENTS 11,036,488 B2 * 6/2021 Marzorati .............. G06N 20/00
12,026,487 B2 * 7/2024 Lee ......................... G06F 8/443

OTHER PUBLICATIONS

Hodge, Tyler, "Hourly electricity consumption varies throughout the day and across seasons", Retrieved from: https://www.eia.gov/todayinenergy/detail.php?id=42915, Feb. 21, 2020, 2 Pages.

White, et al., "Overview of servicing profile in the Microsoft 365 Apps admin center", Retrieved from: https://learn.microsoft.com/en-us/deployoffice/admincenter/servicing-profile, Sep. 22, 2022, 5 Pages.

* cited by examiner

*Primary Examiner* — Thuy Dao
(74) *Attorney, Agent, or Firm* — Schwegman Lundberg & Woessner, P.A.

(57) ABSTRACT

Described herein is a software update distribution service that leverages reinforcement learning—a specific type machine learning algorithm—to discover or learn optimal times (e.g., a schedule) to download software updates and to install software updates for software applications installed on a group of client computing devices of a specific enterprise, in order to achieve one of several predefined goals or objectives selected for the specific enterprise, or for the specific group of client computing devices. Using reinforcement learning, a software-based agent learns to perform activities relating to software updates at specific times that minimize a penalty, wherein the penalty is derived based on a weighted combination of metrics, some of which relate to the impact of software update timing on network traffic and power consumption.

20 Claims, 8 Drawing Sheets

REINFORCEMENT LEARNING FOR CONTROLLING SOFTWARE UPDATE TIMING

TECHNICAL FIELD

The subject matter disclosed herein generally relates to a server-based system and service for managing the process of distributing and installing software updates for software applications installed on client computing devices. More specifically, the subject matter described herein relates to a technique that uses reinforcement learning—a specific type of machine learning—to discover or learn optimal times to perform specific activities relating to software updates in order to achieve one of several user-selectable, pre-defined objectives.

BACKGROUND

Many enterprises have a large number of client computing devices on which software applications have been installed. These software applications benefit from receiving regular software updates, including software updates relating to bug fixes, security patches, performance enhancements, and new features. In many instances, the process of updating a software application is automated. For example, as illustrated in FIG. 1, during an automated software update process, a client-side update agent 100 executing on a client computing device 102 will periodically communicate an update request 104 over a public network 106 to a server-based software update distribution service 108. Upon receiving the request, the software update distribution service 108 will generate and communicate a reply, instructing the client-side update agent 100 to take some action—for example, download a specific software update from a specified location, install a previously downloaded software update, check back for updates at some specific time, and so forth.

With some conventional software update distribution services, the logic for generating a response to an update request received from an update agent is limited and/or rigid (e.g., hard-coded, or static). By way of example, with some conventional software update distribution services, when an update request is received from a client-side update agent, the software update distribution service may simply perform a look-up operation in a database that tracks the status of various software updates to determine whether a new software update is available and/or whether a particular client computing device has installed a specific software update. If a new software update is available, or a client computing device has yet to install a specific software update, the software update distribution service will communicate a reply to the client-side update agent instructing the update agent to immediately download and/or install the software update.

As shown in FIG. 1, with some conventional software update distribution services, the logic that influences the behavior of the software update distribution service 108 when generating the instructions to provide to each client-side update agent 100 may be derived based on a set of hard-coded rules 110 in combination with an update profile 112 for the enterprise. Here, an update profile 112 (sometimes referred to as a servicing profile) is an enterprise-specific profile that specifies various information about each enterprise, such as the number and identity of the client computing devices assigned to the enterprise. For example, as shown in FIG. 1, each of the three separate enterprises may have its own update profile that will be accessible to the software update distribution service 108. An administrator associated with each enterprise may access a user interface of the software update distribution service 108 to specify various settings and parameters for the enterprise, which will influence the behavior of the software update distribution service 108 in connection with performing software updates for client computing devices associated with that specific enterprise. In some instances, an administrator for an enterprise may specify via the update profile 112 that software updates are to occur (or, not occur) on certain days of the week, during one or more specific windows of time, and so forth. Accordingly, with some conventional software update distribution services, an administrator may specify preferred times for software updates to occur, or not occur.

BRIEF DESCRIPTION OF THE DRAWINGS

Embodiments of the present invention are illustrated by way of example and not limitation in the figures of the accompanying drawings, in which.

DETAILED DESCRIPTION

Figure 1:
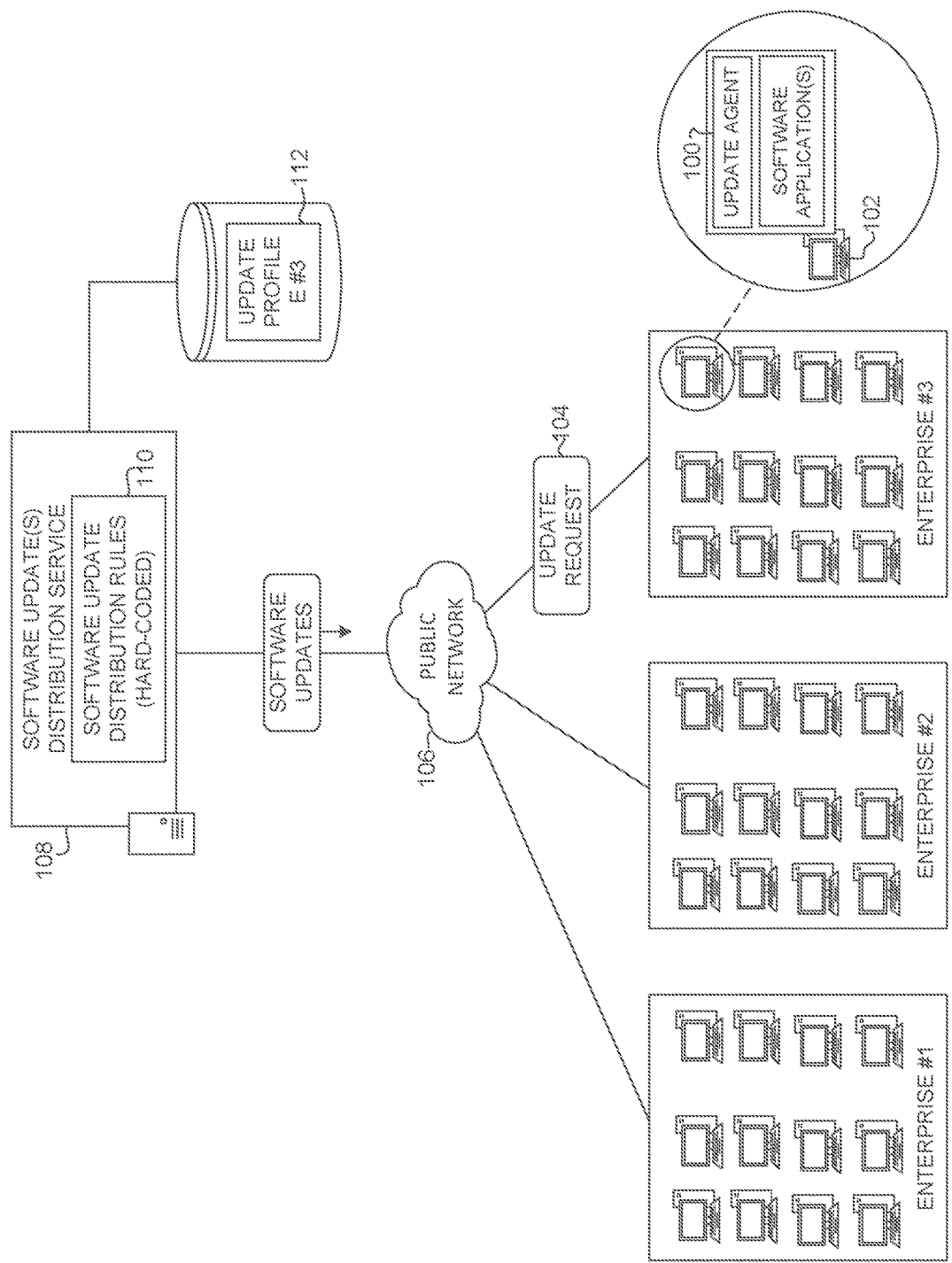
FIG. 1 is a diagram illustrating an example of a network environment in which a conventional software update distribution service may operate to provide software updates to client computing devices.

Described herein is a technique for using reinforcement learning to train a software-based agent of a software distribution service to discover or learn optimal times to perform specific activities relating to the updating of software applications residing on a specific group of client computing devices, in order to achieve some selectable objective. In the following description, for purposes of explanation, numerous specific details are set forth to provide a thorough understanding of the various aspects of different embodiments of the present invention. It will be evident, however, to one skilled in the art, that the present invention may be practiced without all of these specific details.

Many conventional software update distribution services are designed to communicate software updates to client computing devices synchronously—that is, immediately, in response to receiving an update request from a client computing device. In other instances, conventional software distributions services may perform software updates in accordance with a fixed schedule, which may be set by an administrator associated with an enterprise on whose behalf the software updates are performed, or by an administrator or developer associated with the enterprise that develops the software that is being updated. However, there are many factors that may be of importance to any individual enterprise when pushing software updates to managed client computing devices. For example, consider that updating software applications on client computing devices involves CPU intensive operations, such as detecting availability of software updates, downloading the software updates via a public network (e.g., the Internet) and/or private network, extracting the files to obtain the raw binaries, executing complex checksum calculations to verify the software updates, and writing the appropriate data to the correct locations while applying the software updates. With a spike in CPU utilization, there will also be an impact on total power being consumed by the computing device. In the aggregate—that is, considering the power consumption of all client computing devices associated with a single enterprise, and the frequency with which software updates occur—the increase in consumed power that results from performing activities related to software updates is not trivial.

Many enterprises—for example, companies and organizations—have thousands, and in some instances, tens of thousands of employees who use, daily, software applications executing on client computing devices in the performance of their employment responsibilities. Consequently, the various automated activities that are performed to ensure that the software applications are timely updated with current software updates can have a significant impact on both power consumption and network utilization. This has at least three negative effects. First, if a software update is performed during the day, the price per kW for electricity will be higher than if the software update was performed at night. The bifurcated nature of power demand is generally considered to have on-peak hours (e.g., 7:00 am until 11:00 pm on weekdays) and off-peak hours (e.g., between 11:00 pm and 7:00 am on weekdays and all day on Saturdays, Sundays, and holidays). Electricity consumption may have the lowest demand at around 5:00 am and the highest demand occurring at some point during the day (depending on the location, season, and potentially many other factors). However, even these general rules can vary from one location to another, and from one season to the next, and so on. Secondly, when software updates are performed during the peak-hours of electricity demand, this may cause strain on the power grid and ultimately contribute to brown outs—specifically during times of grid stress. Third, software updates may cause network congestion, at the servers providing the software updates—as well as at the private networks (or, sub-networks) local to the client computing devices that are receiving and installing the software updates.

Some conventional software update distribution services provide the ability to specify preferred days or preferred windows of time for software updates. Similarly, conventional software update distribution services provide the ability to specify days or windows of time during which software updates should not be performed. However, because any one enterprise may have a significant number of client computing devices, often in a variety of different locations and different time zones, and because there are so many factors that ultimately impact power consumption and network bandwidth, it can be extremely time consuming to manually determine and set a fixed scheduled by which software updates are to occur. Moreover, because the multitude of factors that impact power consumption and network bandwidth tend to change over time, it can be nearly impossible for an administrator to manually schedule software updates to occur at an optimal time. Furthermore, in many instances, even if an administrator wanted to manually schedule software updates at a time to achieve a specific objective, the administrator would likely not have any understanding of what specific time or schedule would achieve the desired objective. Furthermore, as each enterprise is likely to have client computing devices operating in different conditions (e.g., bandwidth congestion, electrical costs), and because not all enterprises may have the same goals or objectives, having a centralized system that uses the same schedule for each enterprise will have vastly differing results for the various enterprises.

To address the above problems, embodiments of the present invention leverage a specific type of machine learning, referred to as reinforcement learning (RL), which is used to train a software-based RL agent to perform specific actions relating to the updating of software applications on client computing devices at optimal times. The optimal times are learned over time, as the RL agent performs actions relating to software updates. Specifically, the RL agent is trained to perform actions at times that will achieve some specified, predefined goal or objective, for the client computing devices of a specific enterprise, or for some specific group of client computing devices for a specific enterprise.

For example, consistent with some embodiments, for a specific group of client computing devices associated with a specific enterprise, one of three goals or objectives to be pursued in connection with updating software applications is selected. A first goal or objective involves performing the software updates as quickly as possible, without concern for the costs associated with power consumption, or the potential disruption to a local network due to the increase in network activity that may result from performing the various activities in updating the software applications. A second goal or objective is to perform the software updates at a time that will minimize the possibility of any network impact or disruption. Specifically, with this goal or objective, the aim is to perform the software updates at a time when there is otherwise little or no network traffic, so that the network activity involved in the software updates will not add to, and otherwise conflict with, regular network activity. A third selectable goal or objective is to perform the actions of the software update at a time that will minimize the cost associated with the additional power consumption that is incurred when each client computing device is performing activities related to the software updates.

After one of the three specific goals or objectives has been selected for a specific enterprise, or for a specific group of client computing devices associated with a specific enterprise, a server-side software-based RL agent is initially configured to perform a software update process, subject to a first schedule, for all of the client computing devices within the specified group of devices for the specific enterprise. This first schedule may be randomly selected, or set by an administrator. As the client-side update agent executing at each client computing device facilitates the download and installation of the software update, each client-side update agent will monitor the relevant activities and communicate back to the software update distribution server various performance metrics associated with the performance of the software update (e.g., downloading and installing). Described in greater detail below, these performance metrics generally relate to the processing time of an activity (e.g., installing a software update) or CPU utilization, which can be used to determine a measure of power consumption that resulted from the installation of the software update at the client computing device. Another performance metric reported back to the software update distribution server by the client-side update agent may relate to network activity, and specifically, a metric representing the percent of overall network traffic realized on the private sub-network that was attributable to the downloading of the software update. Finally, the client-side update agent may provide to the software update distribution server a performance metric indicating an extent to which an end-user of a client computing device may have been disrupted by the software update. For instance, this metric may reflect whether a person was actively using the client computing device at the time the software update was being downloaded and installed.

At the conclusion of the specific software update process for the group of client computing devices, an overall penalty (e.g., a score) is calculated to reflect a measure of performance, in the aggregate, for all of the client computing devices that received and installed the software update. For instance, the various performance metrics obtained from each individual client-side update agent are used, in combination with other metrics, to generate an individual penalty for a software update to an individual client computing device. Then, the individual penalties for each client computing device are combined (e.g., summed) to arrive at an overall penalty for the entire software update process. In some instances, the calculation of the penalty may be based on a weighted combination of the various components or metrics. Moreover, the individual weighting factors applied to each metric may vary based on the selected goal or objective. By way of example, if the selected goal or objective is to minimize the cost associated with power consumption resulting from the software update process, then the weighting factor associated with the specific metric or component that reflects this cost may be weighted more heavily to emphasize this component in the calculation of the overall penalty.

Once the overall penalty has been calculated, the overall penalty is compared to a predetermined threshold. If the overall penalty exceeds the threshold, the rules and corresponding schedule by which the RL agent performs the various activities for updating software applications is modified. That, is the RL agent is reconfigured to use a new, updated schedule for performing the relevant activities. The rules and corresponding schedule are equivalent to what is known as the policy in the realm of reinforcement learning. The software update process is then repeated for a second software update for the same enterprise or for the same group of client computing devices of the enterprise, using the new schedule. At the conclusion of the second software update process, an overall penalty is again calculated based on the various performance metrics provided by the client-side update agents. The overall penalty is again compared to the threshold, and assuming the overall penalty is in excess of the threshold, the RL agent is again reconfigured to use a new or modified schedule. Accordingly, the schedule that controls the timing of the actions performed by the software-based RL agent is iteratively modified, until the overall penalty for performing a software update process is lower than the specified threshold—a condition referred to as the terminal state. Once the terminal state occurs, the rules and corresponding schedule are not modified, or the changes made to the schedule become more granular in pursuit of minor optimization improvements.

Advantageously, the technique described herein allows for discovering, for each of several different groups of computing devices, an optimal schedule by which specific actions are to occur in the software update process in order to achieve a goal or objective that is specific to the enterprise operating each group of computing devices. In this case, reinforcement learning is advantageous as it allows for the discovery of the optimal schedule, when the optimal schedule for any specific group of client computing devices is unknown and difficult to ascertain, due to the variance in the specific factors that impact the pursued goal or objective. For example, because the environment in which each group of client computing devices is operating will be different and change over time, the technique described herein allows for the system to self-discover, for example, through trial-and-error, the optimal schedule for each enterprise, or each group of client computing devices. Other advantages of the various embodiments of the present invention will be readily ascertained from the description of the several figures that follows.

Figure 2:
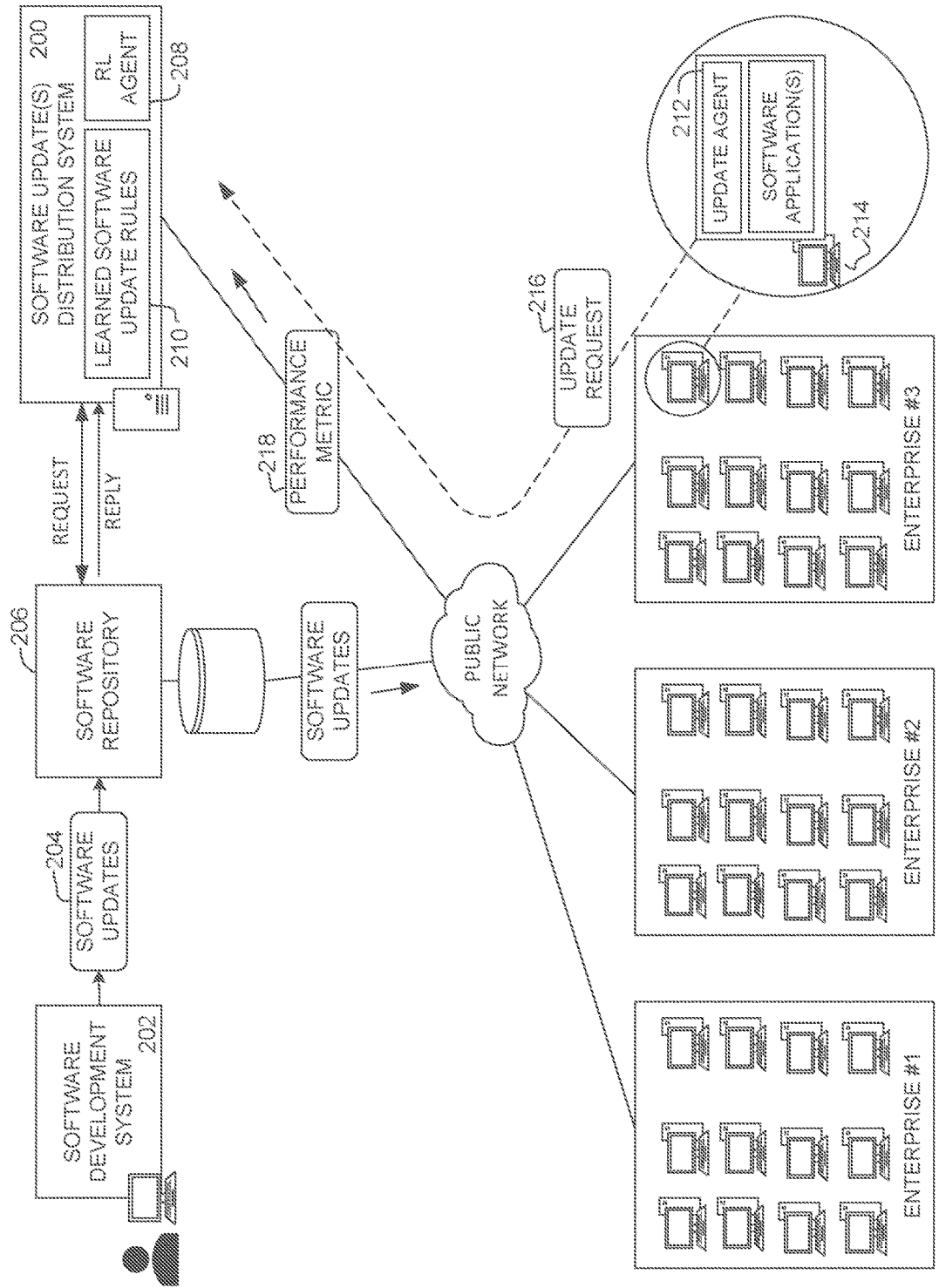
FIG. 2 is a diagram illustrating an example of a network environment in which a software update distribution service, consistent with various embodiments of the present invention, may operate to provide software updates to client computing devices.

FIG. 2 is a diagram illustrating an example of a network environment in which a software update distribution service 200, consistent with various embodiments of the present invention, may operate to provide software updates to client computing devices of various enterprises. As illustrated in FIG. 2, a developer uses a software development system 202 to develop, build, and publish software updates 204 to a software repository 206. Periodically, the software distribution service 200 will communicate a request to the software repository 206, and in turn, receive a notification (e.g., a reply) indicating a software update 204 is available for distribution to some set of client computing devices of the one or more enterprises. As shown in FIG. 2, the software updates 206 are stored in a single software repository 206. However, in various alternative embodiments, software updates may be distributed to various edge computing devices that are part of a content delivery network to improve efficiency in the distribution of the software updates. In general, each client-side update agent 212 will receive instructions on the location from which a software update is to be downloaded.

As shown in FIG. 2, a client-side update agent 212 executing on a client computing device 214 periodically communicates an update request 216 to the software distribution system 200. Upon receiving the update request from a specific client computing device 214, the reinforcement learning (RL) agent 208 of the software distribution system 200 will process the request in accordance with one of several learned or discovered software update rules 210 specific to the enterprise associated with the request 216, or in some instances, specific to one particular group of client computing devices managed by the enterprise. The learned rules, for example, may specify a schedule for performing specific actions, including 1) instructing a client-side update agent 212 to download an available software update, 2) instructing a client-side update agent to install a previously downloaded software update, and 3) instructing a client-side update agent 212 to check back later. For example, as described in greater detail below, the learned rules (and corresponding schedule) are equivalent in concept what is referred to as a policy in the realm of reinforcement learning. As such, the learned rules (and corresponding schedule) specify preferred times for performing the above-referenced actions to achieve one of several predefined objectives that have been selected for the enterprise.

If, for example, the RL agent 208 sends an instruction to the update agent 212 requesting that the update agent 212 download a software update, the update agent 212 will then communicate a request to download the software update. Upon completion of the software update download, the update agent 212 will communicate one or more performance metrics 218 back to the software update distribution system 200. At the conclusion of the rollout of a specific software update to a specific group of client computing devices, the software update distribution system will compute a penalty, reflecting the overall performance or impact of the rollout of the software update. This penalty is then compared to a threshold, and if necessary, the learned software update rules and corresponding schedule for that specific group of client computing devices will be updated or modified in pursuit of better performance with respect to the selected objective.

Figure 3:
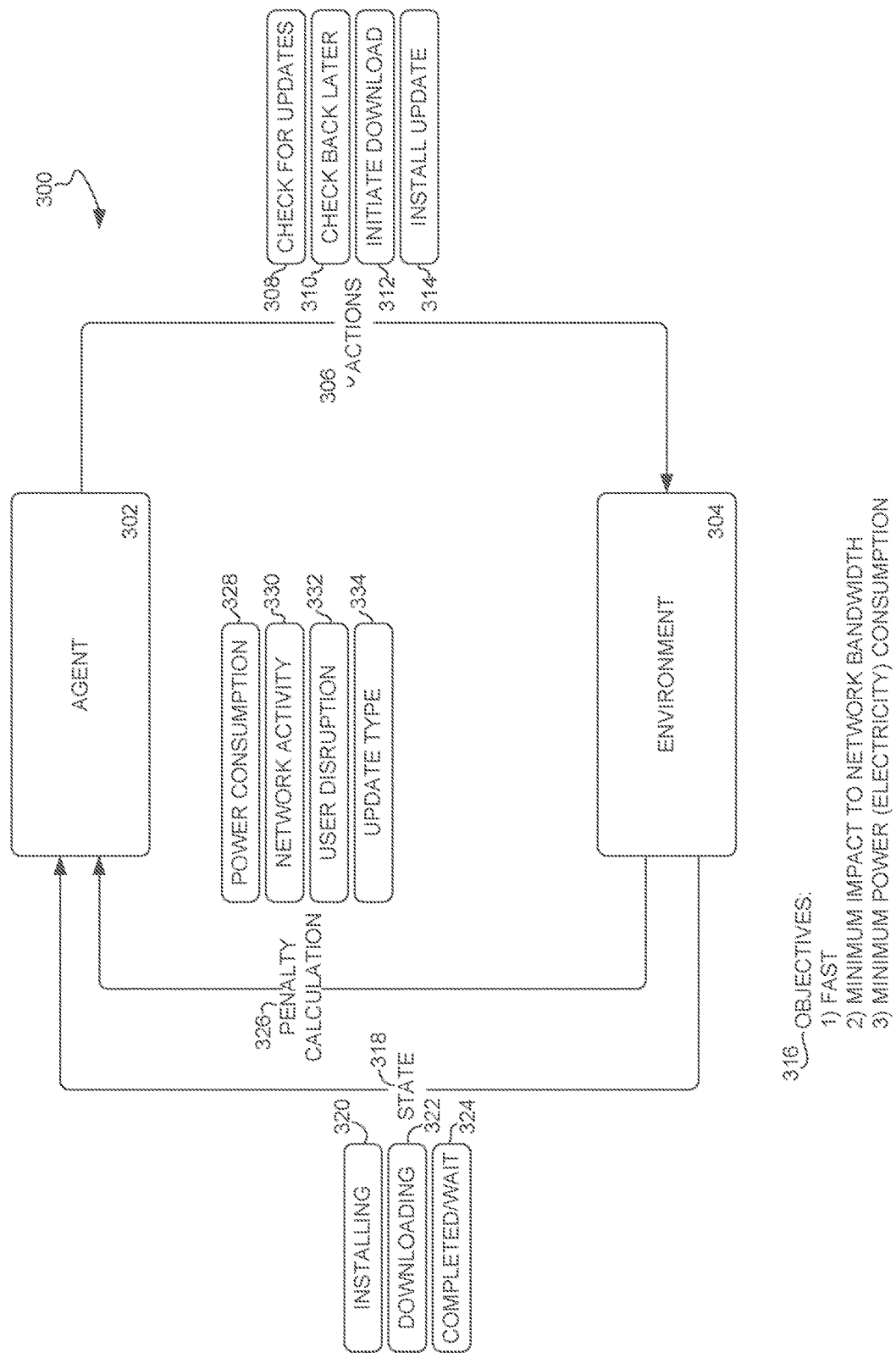
FIG. 3 is a diagram illustrating an example of a model for a type of machine learning—referred to as reinforcement learning—which is used to discover or learn optimal times to perform various activities relating to the updating of software applications on client computing devices, consistent with embodiments of the present invention.

FIG. 3 is a diagram illustrating an example of a model 300 for a type of machine learning—referred to as reinforcement learning—which is used to discover or learn optimal times to perform various actions relating to the updating of software applications on client computing devices, consistent with embodiments of the present invention. The model shown in FIG. 3 is a visual depiction of what is known as a Markov Decision Process (MDP), which is frequently used to convey how reinforcement learning works. In general, reinforcement learning (RL) is a type of machine learning in which an agent 302 learns to make decisions, or take actions 306, in an environment 304 to achieve a certain goal or objective 316. The goal of reinforcement learning is for the agent 302 to learn to take actions 306 at times that minimize the cumulative penalty that is observed from the environment 304 as a result of the actions 306. The agent 302 learns through trial and error, by taking actions 306 and observing the outcomes (e.g., calculating a penalty), and then adjusting its behavior accordingly.

In general, the training process involves the following steps:

The agent 302 starts by taking actions in the environment 304 based on a set schedule, or perhaps randomly selected schedule.

The environment 304 provides feedback (e.g., performance metrics) that is used to calculate a penalty 326, reflecting how well the agent 302 has performed.

The agent 302 learns to associate the timing of specific actions 306 with specific outcomes, and uses this information to make better decisions in the future.

The behavior of the agent 302 is continually refined through trial and error, as it learns from its experiences.

Over time, the performance of the agent 302 improves, as the agent 302 learns to take actions 306 at optimal times that minimize its cumulative penalty.

In this instance, the agent 302 is trained to discover the optimal times for a client computing device to take specific actions 306 in order to achieve a selected objective 316. Here, the actions taken by the agent 302 include:

Check for a software update 308;
Instruct a client-side update agent to check back later 310;
Instruct a client-side update agent to initiate a download of a software update 312; and
Instruct a client-side update agent to install a previously downloaded software update 314;

In this case, the optimal times are those times that will achieve one of three predefined objectives 316 that have been selected for a specific group of client computing devices, or for all client computing devices of one enterprise. As shown in FIG. 3, the user selectable objectives include:

1) FAST—perform the software update process as quickly as possible;
2) MINIMUM IMPACT TO NETWORK BANDWIDTH—perform the software update process at times that will not interfere with regular network traffic;
3) MINIMUM POWER (ELECTRICTY) CONSUMPTION—perform the software update process at times that will minimize the costs associated with power consumption.

Reinforcement learning is based on the idea of trial and error, where the agent 302 takes actions 306 in the environment 304, observes the resulting state 318 and calculates a penalty 326, and then learns to adjust its actions 308 (in this case, the timing of those actions) in order to minimize its cumulative penalty over time. As shown in FIG. 3, the basic components of an RL system include the agent 302, the environment 304, a set of possible actions 306, a set of possible states 318, and a penalty 326 that reflects how an agent 302 has performed. The agent 302 learns to perform selected actions 306 at times that lead to the lowest cumulative penalty by using a trial-and-error approach. The agent 302 updates its knowledge of the environment by observing the outcomes of its actions 306, and adjusting its behavior accordingly. Specifically, in this instance, the agent 302 adjusts the timing or schedule of the various actions 306.

Initially, the agent 302 is configured to take actions 306 based on some set schedule, or randomly selected schedule. Then, after a specific software update process has completed, as reflected by the state 318 of each client computing device in a particular group of client computing devices, the penalty is calculated for the software update process. In this model, the state 318 is represented as a centralized state representation, where the state of the system is defined as the combined information from all the client-side update agents. In this centralized state representation, the state includes information about the individual update agents, but also the interactions with each other and the environment. The individual states of the client-side update agents comprise of all the variables which would impact a software update process for that client computing device. Effectively, this means that a penalty is calculated when all of the client-side update agents have cycled through the various states to complete a software update process. However, as it may frequently be the case that a specific client device is offline for an extended period, with some embodiments, a state change may occur when, for example, some specified percentage of the total number of client computing devices have completed a specific software update. Furthermore, with some embodiments, status changes may be time based. For example, the system may simply provide some predetermined amount of time for a specific software update to complete. Upon the lapse of the duration of time, the state is presumed to change to a completed state.

As shown in FIG. 3, the penalty calculation 326 takes into consideration several observations from the environment 304. Specifically, the penalty reflects performance metrics that result from each individual client-side update agent cycling through the various states as the update agent downloads and installs the software update on a client computing device. For instance, as shown in FIG. 3, the penalty calculation 326 takes into consideration the power consumption 328 that resulted from the software update, and the impact on network activity 330 that resulted from the software update. In addition, with some embodiments, a metric reflecting the extent to which a software update disrupted 332 the activity of an end-user impacts the calculation of the penalty. Finally, with some embodiments, the specific type of update 334 (e.g., bug fix, security patch, new feature, etc.) may impact the penalty calculation. Once the RL agent is trained, it can make decisions in real time with minimal computational overhead.

Figure 4:
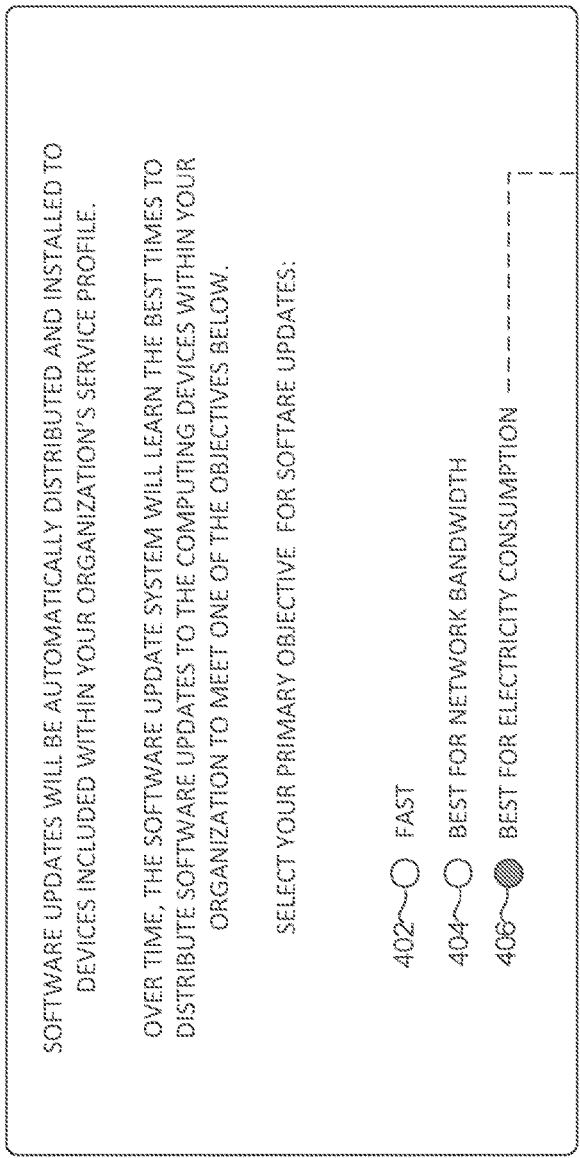
FIG. 4 is a diagram illustrating an example of a user interface via which an administrator of a specific enterprise may specify one of several goals or objectives to be achieved while a software update distribution service is performing activities relating to the updating of software applications on client computing devices for the specific enterprise, consistent with various embodiments of the present invention.
Figure 4:
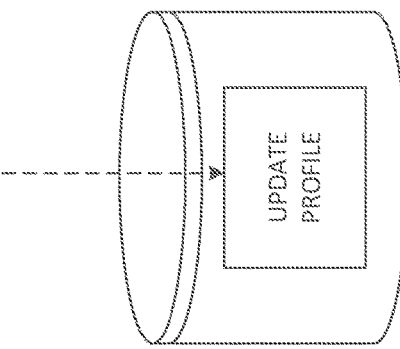

FIG. 4 is a diagram illustrating an example of a user interface 400 via which an administrator of a specific enterprise may specify one of several goals or objectives to be achieved while a software update distribution service is performing activities relating to the updating of software applications on client computing devices for the specific enterprise, consistent with various embodiments of the present invention.

Consistent with some embodiments, one of the several objectives that may be selected for a specific group of client computing devices, or for all client computing devices of a specific enterprise, is referred to simply as "Fast" 402 When this objective ("Fast") is selected, the software update distribution service will optimize the schedule, (e.g., the timing of actions) for speed.

A second selectable goal or objective, as shown in FIG. 4, is referred to as "Best for Network Bandwidth" 404. With this option, the software update process is performed in accordance with a learned schedule that will optimize for reducing or minimizing the impact on network traffic. Accordingly, this objective may be desirable for enterprises with poor network infrastructures. Also, this goal or objective may be desirable in certain scenarios, such as when software updates involve extremely large package sizes, such as the case may be when an enterprise is regularly having client computing devices update from an out-of-compliance software build to the latest software build, which tends to involve a complete reinstallation of the bits.

Finally, a third selectable goal or objective is shown and referred to in FIG. 4 as "Best for Electricity Consumption" 406. When this goal or objective is selected, the software update distribution service will aim to discover a schedule for performing software update actions that minimizes the cost of the power consumption resulting from the software updates. This may be selected, for example, when an enterprise wants to minimize its carbon footprint by ensuring that the client computing devices wake-up to perform software updates when the electricity consumption is at its lowest price.

The user interface presented in FIG. 4 may be accessible by an administrator of an enterprise, such that the administrator can make a selection of interest to the enterprise. However, in other instances, the user interface may be accessible only to the enterprise that is providing the software updates. Consistent with some embodiments, one of the several goals or objectives shown in the example user interface 400 may be selected for a subset of the entire set of computing devices of a specific enterprise. For example, an enterprise may select a first objective, for a first subset of computing devices, while selecting a second objective for a second set of computing devices. In general, the organization or grouping of client computing devices may be accomplished via an update profile for the enterprise, which is often referred to in this context as a servicing profile.

Consistent with some examples, a selected objective for a specific group of client computing devices may be applicable to all types of software updates, for example, such as bug fixes, security patches, performance enhancements, and new features. However, consistent with some alternative examples, the different selectable objectives may be applied to different types of software updates as well. By way of example, a single enterprise may elect "Fast" 402 for bug fixes and security patches, while selecting "Best for Network Bandwidth," 404 for feature updates, and "Best for Electricity Consumption," 406 for quality updates.

Furthermore, with some embodiments, an administrator for an enterprise may specify days and/or windows of time during which software updates are preferred, or, during which software updates should be prohibited. These scheduled day/time preferences will then be taken into consideration as the RL agent attempts to optimize a schedule for taking actions to obtain the selected objective.

Figure 5:
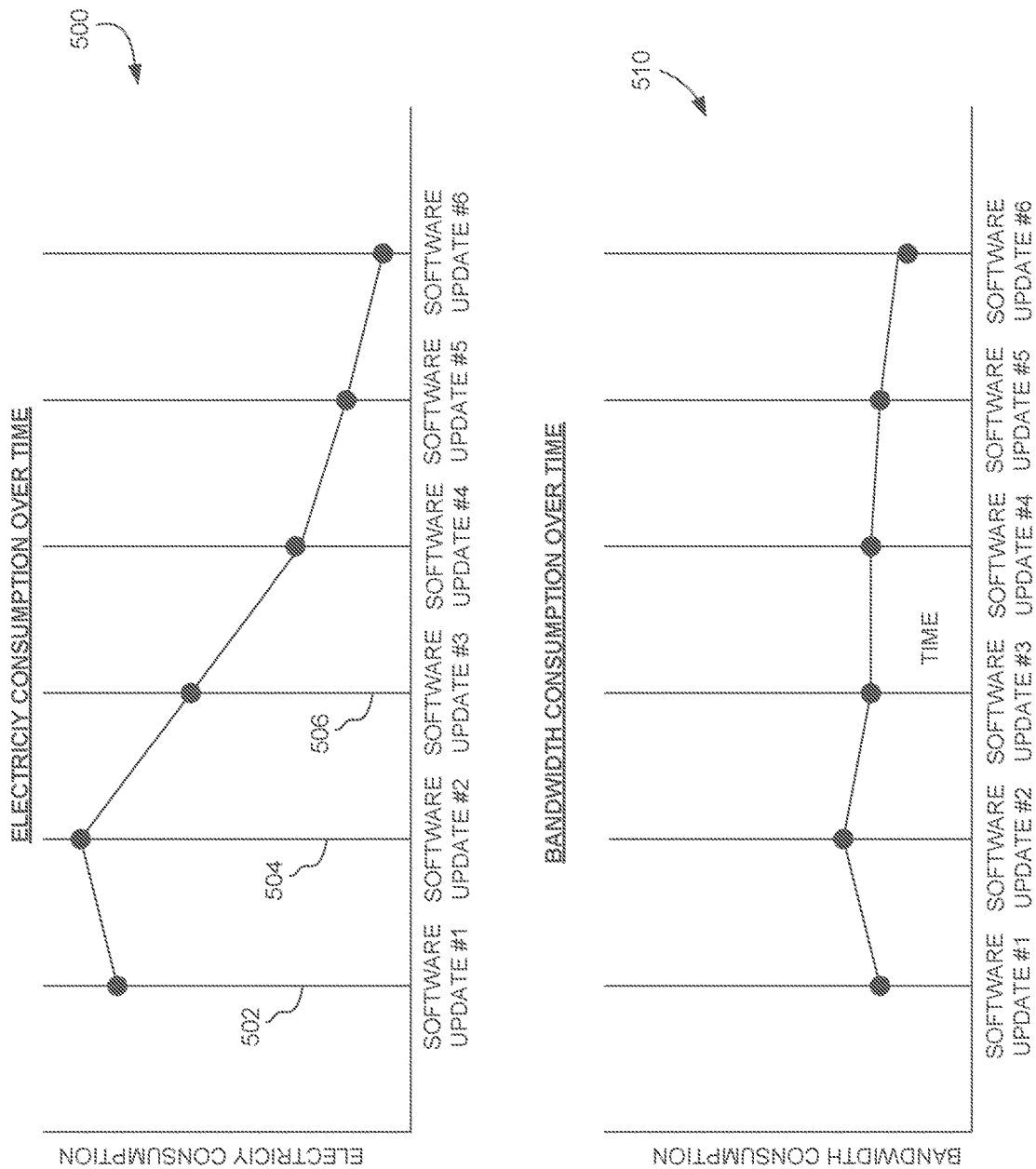
FIG. 5 is a diagram illustrating a pair of charts illustrating how the performance of a software update distribution service improves over time, trending toward a user-selected objective, consistent with some embodiments.

FIG. 5 is a diagram illustrating a pair of line charts that show how the performance of a software update distribution service improves over time, with respect to a particular objective, consistent with some embodiments. For purposes of the example presented in FIG. 5, the selected objective for the software update, for the specific group of client computing devices, is to minimize the power consumption resulting from the software update process. By way of example, FIG. 5 illustrates a first line chart 500 showing an amount of power (electricity) consumption that has resulted for each of several software updates, over time. For example, the line with reference number 502 represents a first software update, which occurred based on a first schedule. That is, the RL agent was initially configured to take actions based on a first schedule, which may be randomly chosen, or set by an administrator. The dot on the line 502 represents the level of consumed power that resulted, based on the RL agent performing the software update process subject to the first schedule.

At the completion of the first software update, the RL agent was modified or reconfigured to take actions based on a new schedule. As reflected by the point on the line with reference 504, corresponding with the second software update (e.g., software update #2), the performance of the RL agent was worse during the second software update than in the first software update. That is, using the new schedule, more power was consumed in performing the second software update than the first. However, after revising the schedule a second time, after completing the second software update, as evidenced by the point on the line with reference number 506, the performance of the RL agent improved, as the overall power consumption for the third software update was reduced generally—and was less than the power consumed for the second software update. As the process of training the RL agent continued with each software update, the power consumption associated with each software update decreased, as reflected in the chart 500. In this example as presented in FIG. 5, the selected goal or objective was to minimize power consumption. Accordingly, as reflected by the line chart with reference 508, the overall impact on network bandwidth was negligible in this case.

Figure 6:
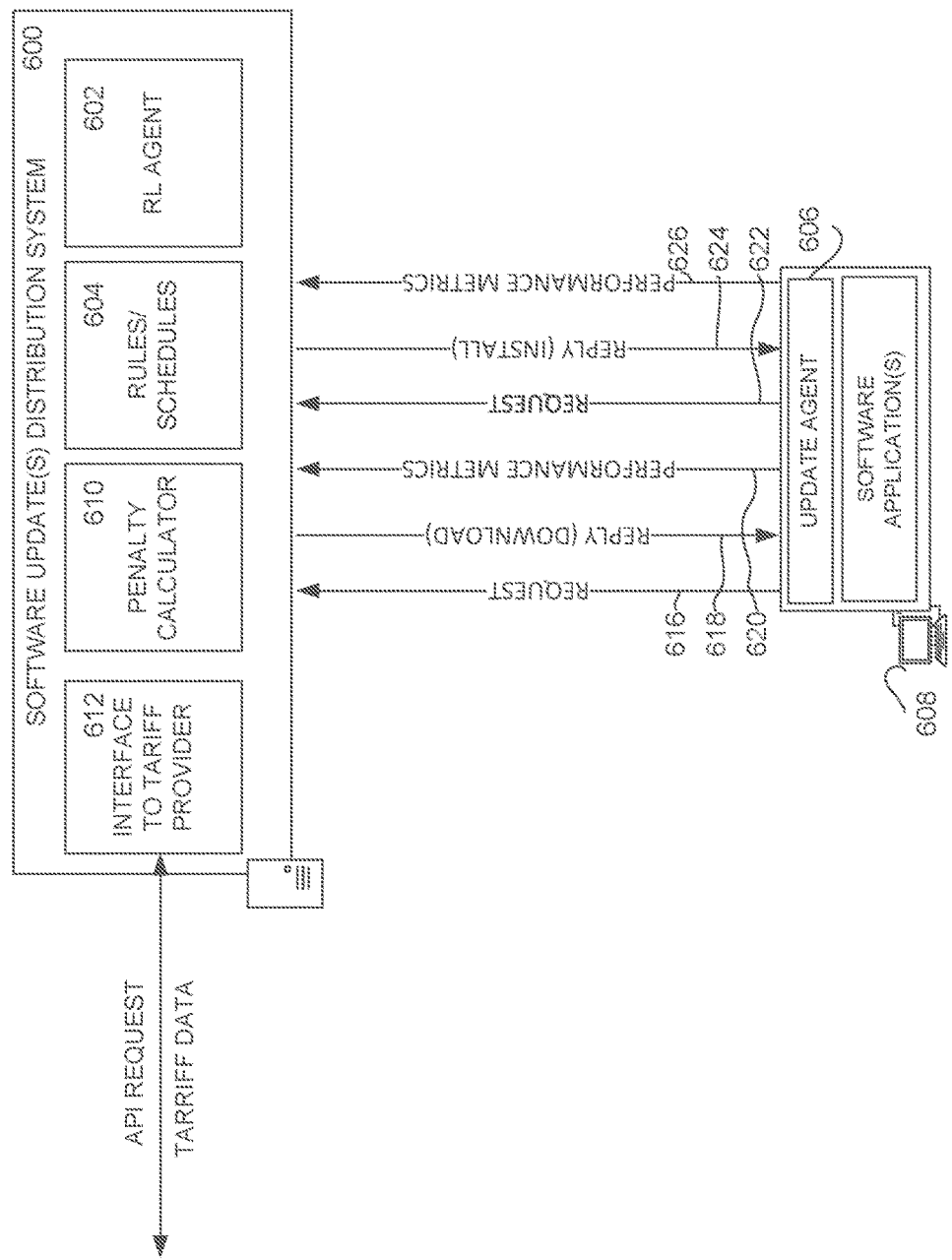
FIG. 6 is a diagram illustrating various functional components of a software update distribution service, and specifically illustrating an example of a how a penalty may be calculated, consistent with some embodiments of the invention.

FIG. 6 is a diagram illustrating various functional components of a software update distribution system 600, consistent with some embodiments of the invention. Each individual instance of a software update procedure involves distributing and installing a specific software update to a defined set or group of client computing devices associated with one enterprise—often referred to as a tenant. Although not shown in FIG. 6, each enterprise or tenant may have an update profile (sometimes referred to as a servicing profile) that may specify various settings and parameters that influence the behavior of the software distribution service 600 with respect to the specific client computing devices of that specific enterprise. By way of example, through the update profile, an administrator for the enterprise or tenant may be able to specify different groups of client computing devices, where each group of devices may be in the same location, subject to the same utility tariff schedule, and subject to the same specified objective or goal for software updates.

When a software update procedure is initially invoked to install a particular software update for a particular software application installed to a specific group of client computing devices, the RL agent 602 of the software update distribution system 600 will reply to an update request received from a client-side update agent 606 executing on a client computing device by communicating to the update agent specific instructions. The specific instructions are determined by the RL agent 602 by querying or consulting the rules/schedules 604 for the specific software update procedure and group of client computing devices. For example, the schedule 604 for the software update procedure determines the timing of the actions that are taken by the RL agent 602. Accordingly, if the schedule indicates that the update agent 606 should download a software update at a specific future time, or within a specific future time window, the RL agent 602 may initially communicate a reply to the update agent, instructing the update agent to check back with the RL agent 602 at some specified future time (e.g., one minute, ten minutes, four hours, etc.).

If, however, the schedule 604 indicates that it is an appropriate time for the client-side update agent 606 to download the software update, the RL agent 602 will communicate a reply 618 to the request 616, by instructing the client-side update agent 606 to download the software update. The reply 618 will typically indicate the location of the software update, so that the update agent 606 understands to direct a request to the appropriate location to download the software update. After the update agent 606 has processed the instruction to download the software update, and after the software update has been downloaded to the client computing devices 608, the update agent 606 may communicate one or more performance metrics 620 back to the software update distribution system 600. In general, the performance metric may indicate an amount of processing time, CPU utilization, or a measure of network traffic that resulted from completing the action to download the software update. Also, the performance metric may indicate some measure of the extent to which the downloading of the software update may have disrupted the activities of an end-user of the client computing device—for example, if the download occurred while the end-user was actively using the client computing device 608.

Referring again to FIG. 6 and continuing with the example, at some point after completing the download of the software update, the client-side update agent 606 will communicate a second update request 622 to the RL agent 602 of the software update distribution system 600, and the RL agent 602 will once again generate a reply 624 with instructions, based on the schedule 604. If, for example, the schedule 604 indicates it is an appropriate time for the client-side update agent 606 to install the previously downloaded software update, as shown in FIG. 4, the reply 624 from the RL agent 602 to the update agent 606 will include instructions indicating that the client-side update agent 606 is to install the previously downloaded software update.

Upon completing the installation of the software update for the software applications installed at the client computing device 608, the client-side update agent 606 will communicate back to the software update distribution system 600 additional performance metrics, specifically relating to the performance observed while the software update was being installed. The performance metrics will be the same or similar in nature to those reported subsequent to the download of the software update. Once the client-side update agent 608 has successfully downloaded and installed the software update at the client computing device 608, the state of the specific client computing device is updated to reflect that the download and installation of the software update has completed, and that the client computing device has once again entered a wait state.

With the client computing device 608 now in a wait state, the penalty calculator 610 will calculate the penalty associated with the updating the software application at the client computing device. Consistent with some examples, the penalty calculator will first calculate the penalty for each of the several client computing devices that have successfully downloaded and installed the software update, and then generate an overall or aggregate penalty for the software update procedure by combining the individual penalties associated with each individual client computing device.

Consistent with some examples, the calculation of the penalty is a weighted combination of several components or metrics. The weighting factors that are associated with and applied to each of the individual contributing components may be different depending upon the selected objective or goal. For example, if the objective or goal for a particular software update procedure and group of client computing devices is to perform the update at a time that will minimize power consumption, then the weighting factor that applies to that component of the overall penalty that reflects a measure of power consumption may be weighted more heavily than the same weighting factor as used in calculating a penalty where the selected objective is speed, or minimal network impact.

One of the metrics that is reported to the penalty calculator 610 by each client-side update agent 606 is a metric that measures CPU utilization by the update agent 606 as it is performing various tasks relating to the downloading and installation of the software update. Accordingly, with some embodiments, a metric representing power consumption can be derived by multiplying a measure of CPU usage by the relevant tariff for electricity at the time and location of the software update. Accordingly, as illustrated in FIG. 6, consistent with some examples, the software update distribution system 600 includes an interface to a tariff provider 612. Consistent with some examples, the interface to the tariff provider 612 leverages one or more publicly available application programming interfaces (APIs) that allow the software update distribution service 600 to query for rate schedules from different utility providers. Accordingly, using the various electricity rate schedules obtained from different utility providers, the penalty calculator 610 can generate an accurate estimate of the power consumption attributable to the execution of the update agent 606 as it performed activities associated with downloading and installing the software update. These estimates are then contributing components to the penalty that is calculated for the software update on each individual client device.

Consistent with some examples, one of the contributing components for the penalty calculation is a metric that indicates the percentage of overall network traffic that is attributable to the downloading of the software component to the client computing device. Accordingly, to calculate the percent bandwidth usage for an individual computing device, or an entire subnet, the following formula may be used:

$$v = \frac{100 * b}{N}$$

in which b is the downloaded bits for the software update and N represents the overall bits downloaded within the subnet, computing device, etc., during the same time period.

In some instances, the type of software update may be used as a component in the penalty calculation as well. For example, not all software update types are equally important or have the same priorities. For example, a security software update should be applied to client computing devices quickly with less or no emphasis on the electrical cost or network usage. Accordingly, different software update types may be assigned different values. An example set of values may be: zero for a security update; five for a quality (e.g., non-security bug fixes) update; and ten for a feature update (e.g., new features added to an application). The values may be stored in a lookup table in various examples. Regardless of the selected objective, because the RL agent is attempting to minimize the total penalty, this means that the policy will lead to actions that instruct the computing devices to update immediately for security software updates.

Consistent with some examples, end-user disruption may be a contributing component in calculating the penalty. Here, end-user disruption occurs when an end-user is actively engaged in a task using the client computing device at the time the software update is being downloaded to the device, and/or installed at the device. An example set of values may be: a zero value for no disruption; five for when an update was downloaded/installed while the computing device was active; and ten for a perceived performance degradation because of the determined activity. Performance degradation may be inferred by comparing a usage metric (e.g., CPU or memory usage) averages prior to an update/download to the same metric during the update/download. If the difference is above a certain threshold, a performance degradation may be inferred. In another example, a process ID of the update/download may be examined, and if the CPU/Memory usage of the process is above a certain percentage, a performance degradation may be inferred.

The penalty calculation may be computed as a summation or weighted combination of individual penalty values of each contributing metric (e.g., electricity cost, network load contribution, update type and end-user disruption). In various examples, the total penalty is squared to enhance the differences between low and high summed penalty values. Furthermore, the penalty value may be the average of individual penalty calculations for each computing device in a group of computing devices. Alternatively, the penalty value may be the sum of each individual penalty calculation of the client computing devices in the group.

After a software update procedure for a specific software update and group of client computing devices has been completed and the overall penalty has been calculated, the penalty is compared to a threshold. If the penalty exceeds the threshold, then the schedule associated with the specific group of client computing devices is reconfigured so that the download and install times are modified for the next software update procedure that is performed with respect to that specific group of client computing devices. If, however, the value of the overall penalty is less than the threshold, then the RL agent may not be reconfigured to use a new schedule. Alternatively, the schedule change may be refined so that only very small changes are made in an attempt to reduce the value of the penalty for subsequent software update procedures.

Machine and Software Architecture

Figure 7:
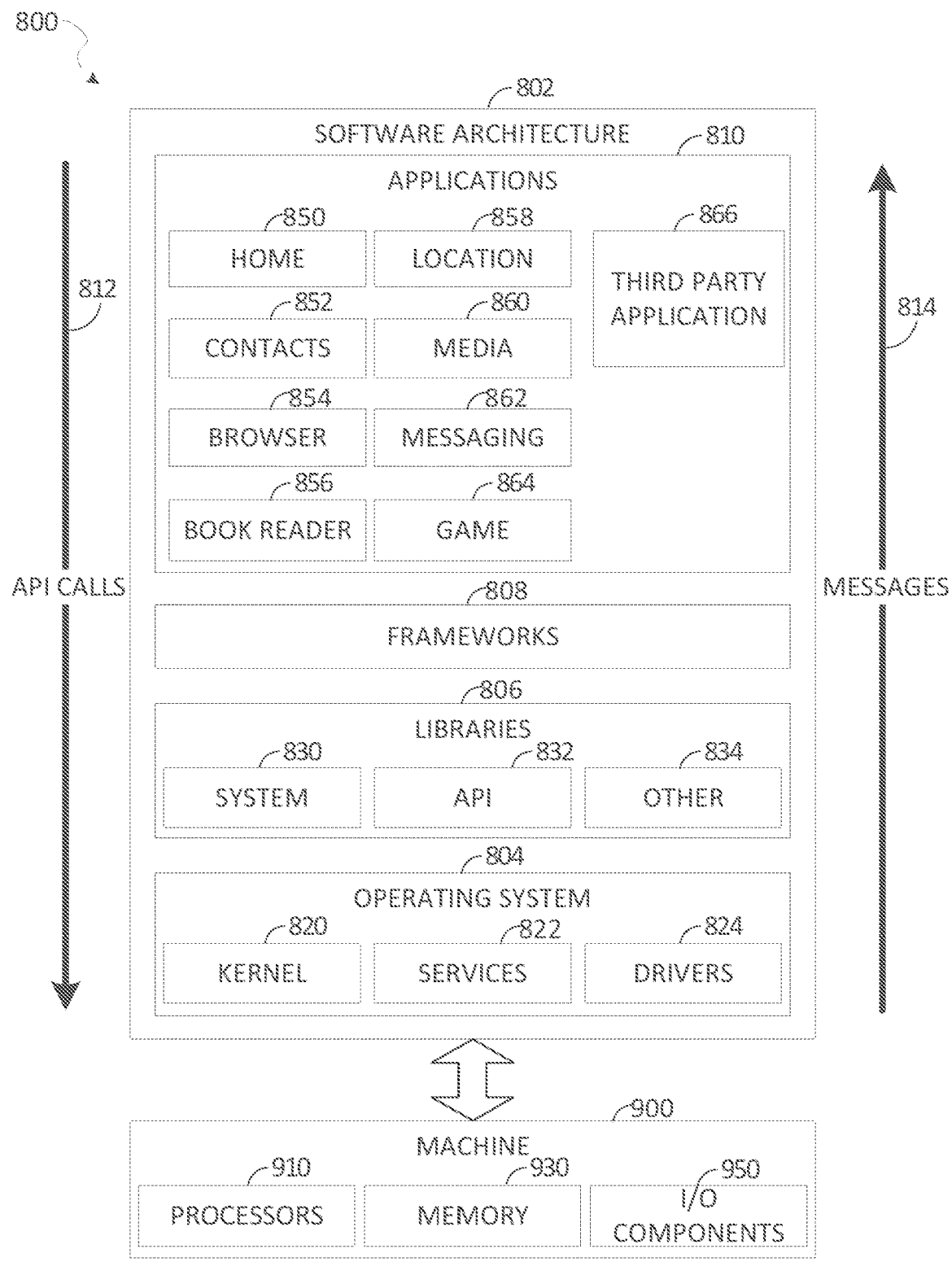
FIG. 7 is a block diagram illustrating a software architecture, which can be installed on any of a variety of computing devices to perform methods consistent with those described herein.

FIG. 7 is a block diagram 800 illustrating a software architecture 802, which can be installed on any of a variety of computing devices to perform methods consistent with those described herein. FIG. 7 is merely a non-limiting example of a software architecture, and it will be appreciated that many other architectures can be implemented to facilitate the functionality described herein. In various embodiments, the software architecture 802 is implemented by hardware such as a machine 900 of FIG. 8 that includes processors 910, memory 930, and input/output (I/O) components 950. In this example architecture, the software architecture 802 can be conceptualized as a stack of layers where each layer may provide a particular functionality. For example, the software architecture 802 includes layers such as an operating system 804, libraries 806, frameworks 808, and applications 810. Operationally, the applications 810 invoke API calls 812 through the software stack and receive messages 814 in response to the API calls 812, consistent with some embodiments.

In various implementations, the operating system 804 manages hardware resources and provides common services. The operating system 804 includes, for example, a kernel 820, services 822, and drivers 824. The kernel 820 acts as an abstraction layer between the hardware and the other software layers, consistent with some embodiments. For example, the kernel 820 provides memory management, processor management (e.g., scheduling), component management, networking, and security settings, among other functionality. The services 822 can provide other common services for the other software layers. The drivers 824 are responsible for controlling or interfacing with the underlying hardware, according to some embodiments. For instance, the drivers 824 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 806 provide a low-level common infrastructure utilized by the applications 810. The libraries 806 can include system libraries 830 (e.g., C standard library) that can provide functions such as memory allocation functions, string manipulation functions, mathematic functions, and the like. In addition, the libraries 806 can include API libraries 832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 806 can also include a wide variety of other libraries 834 to provide many other APIs to the applications 810.

The frameworks 808 provide a high-level common infrastructure that can be utilized by the applications 810), according to some embodiments. For example, the frameworks 608 provide various GUI functions, high-level resource management, high-level location services, and so forth. The frameworks 808 can provide a broad spectrum of other APIs that can be utilized by the applications 810, some of which may be specific to a particular operating system 804 or platform.

In an example embodiment, the applications 810 include a home application 850, a contacts application 852, a browser application 854, a book reader application 856, a location application 858, a media application 860, a messaging application 862, a game application 864, and a broad assortment of other applications, such as a third-party application 866. According to some embodiments, the applications 810 are programs that execute functions defined in the programs. Various programming languages can be employed to create one or more of the applications 810, structured in a variety of manners, such as object-oriented programming languages (e.g., Objective-C, Java, or C++) or procedural programming languages (e.g., C or assembly language). In a specific example, the third-party application 866 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 866 can invoke the API calls 812 provided by the operating system 804 to facilitate functionality described herein.

Figure 8:
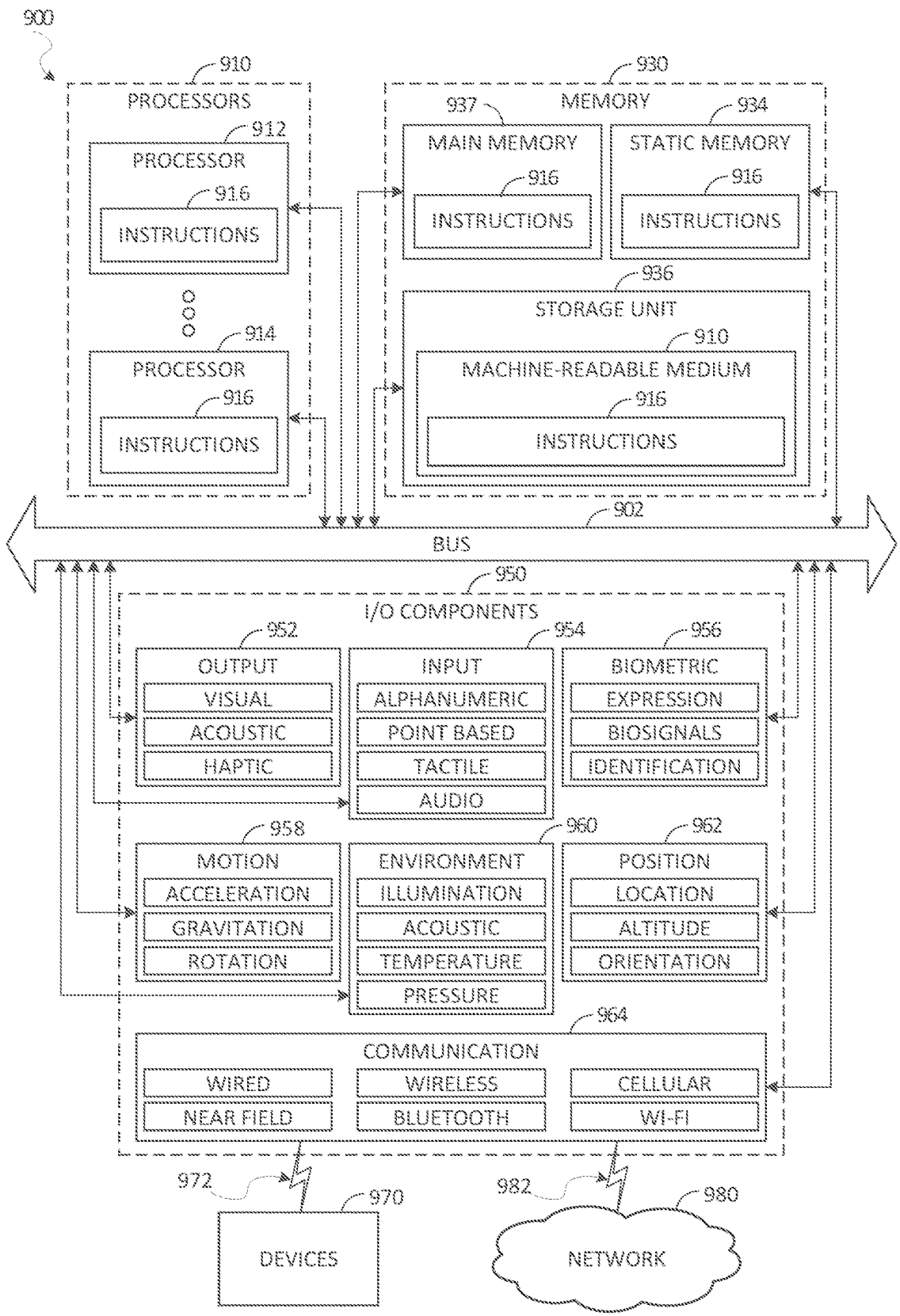
FIG. 8 is a system diagram illustrating an example of a computing device with which embodiments of the present invention might be implemented.

FIG. 8 illustrates a diagrammatic representation of a machine 900 in the form of a computer system within which a set of instructions may be executed for causing the machine to perform any one or more of the methodologies discussed herein, according to an example embodiment. Specifically, FIG. 8 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example the instructions 916 may cause the machine 900 to execute any one of the methods or algorithmic techniques described herein. Additionally, or alternatively, the instructions 916 may implement any one of the systems described herein. The instructions 916 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other such as via a bus 902. In an example embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 912 and a processor 914 that may execute the instructions 916. The term "processor" is intended to include multi-core processors that may comprise two or more independent processors (sometimes referred to as "cores") that may execute instructions contemporaneously. Although FIG. 8 shows multiple processors 910, the machine 900 may include a single processor with a single core, a single processor with multiple cores (e.g., a multi-core processor), multiple processors with a single core, multiple processors with multiples cores, or any combination thereof.

The memory 930 may include a main memory 932, a static memory 934, and a storage unit 936, all accessible to the processors 910 such as via the bus 902. The main memory 930, the static memory 934, and storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 8. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962, among a wide array of other components. For example, the biometric components 956 may include components to detect expressions (e.g., hand expressions, facial expressions, vocal expressions, body gestures, or eye tracking), measure bio-signals (e.g., blood pressure, heart rate, body temperature, perspiration, or brain waves), identify a person (e.g., voice identification, retinal identification, facial identification, fingerprint identification, or electroencephalogram-based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 962 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a USB).

Moreover, the communication components 964 may detect identifiers or include components operable to detect identifiers. For example, the communication components 964 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 930, 932, 934, and/or memory of the processor(s) 910) and/or storage unit 936 may store one or more sets of instructions and data structures (e.g., software) embodying or utilized by any one or more of the methodologies or functions described herein. These instructions (e.g., the instructions 916), when executed by processor(s) 910, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 980 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., HTTP). Similarly, the instructions 916 may be transmitted or received using a transmission medium via the coupling 972 (e.g., a peer-to-peer coupling) to the devices 070. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Computer-Readable Medium

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A computer-implemented method performed by a software update distribution service, the method comprising:
   receiving an indication of a selected objective to be pursued by a software-based reinforcement learning (RL) agent in performing actions relating to the updating of software applications installed on a set of client computing devices;
   configuring the software-based RL agent to perform the actions subject to a randomly selected first schedule, wherein the actions comprise i) instructing an update agent executing at a client computing device to download a software update, and ii) instructing an update agent executing at a client computing device to install a previously downloaded software update;
   invoking the software-based RL agent to perform a first software update procedure for a first software update by performing the actions subject to the randomly selected first schedule;
   upon determining a change in a status, calculating a penalty associated with the software-based RL agent completing the first software update procedure for the first software update by performing the actions subject to the randomly selected first schedule;
   comparing the penalty to a predetermined threshold; and
   upon determining that the penalty exceeds the predetermined threshold, reconfiguring the software-based RL agent to perform actions subject to a second schedule, the actions relating to the updating of software applications executing on the set of client computing devices with a second software update.

2. The computer-implemented method of claim 1, wherein the software-based RL agent is to perform a plurality of software update procedures for a plurality of software updates, wherein actions performed in completing each software update procedure are subject to a new schedule until a penalty calculated for completing a software update procedure subject to a specific schedule is less than the predetermined threshold.

3. The computer-implemented method of claim 1, further comprising:
   causing presentation of a user interface that includes a prompt to select one objective from a plurality of objectives, wherein receiving the indication of the selected objective occurs as a result of an end-user selecting one objective from the plurality of objectives, the plurality of objectives comprising:
   a first objective prioritizing speed in completing a software update process;
   a second objective prioritizing a minimum impact to network traffic; and
   a third objective prioritizing a minimum cost of power consumption.

4. The computer-implemented method of claim 1, wherein determining a change in the status comprises one of:
   determining that a software application installed on each client computing device of the set of client computing devices has been updated;
   determining that a software application installed on some predetermined percentage of the set of client computing devices has been updated;
   determining that some predetermined duration of time has elapsed since the software-based RL agent has been invoked to perform a software update procedure.

5. The computer-implemented method of claim 1, wherein calculating the penalty associated with the software-based RL agent completing the first software update procedure for the first software update by performing the actions subject to the randomly selected first schedule comprises:
   calculating the penalty as a weighted combination of metrics, wherein the weighting of the metrics is dependent upon the selected objective.

6. The computer-implemented method of claim 1, wherein calculating the penalty associated with the software-based RL agent completing the first software update procedure for the first software update by performing the actions subject to the randomly selected first schedule comprises:
   calculating the penalty as a weighted combination of metrics, wherein one metric in the combination of metrics is derived by multiplying a tariff for electricity by a metric representing a collective amount of power consumed by the set of client computing devices in completing a software update procedure.

7. The computer-implemented method of claim 1, wherein calculating the penalty associated with the software-based RL agent completing the first software update procedure for the first software update by performing the actions subject to the randomly selected first schedule comprises:
   calculating the penalty as a weighted combination of metrics, wherein one metric in the combination of metrics represents a percentage of overall traffic observed in a local network that is attributable to the completion of the software update process.

8. The computer-implemented method of claim 1, wherein calculating the penalty associated with the software-based RL agent completing the first software update procedure for the first software update by performing the actions subject to the randomly selected first schedule comprises:

calculating the penalty as a weighted combination of metrics, wherein one metric in the combination of metrics represents an extent to which completions of the software update process disrupted end-user activity at a client computing device.

9. The computer-implemented method of claim 1, wherein calculating the penalty associated with the software-based RL agent completing the first software update procedure for the first software update by performing the actions subject to the randomly selected first schedule comprises:

calculating the penalty as a weighted combination of metrics, wherein one metric in the combination of metrics represents a score associated with a type of the first software update, the type comprising one of:
a security software update;
a quality software update; or
a feature software update.

10. A system comprising:
at least one processor;
a memory storage device storing instructions thereon, which, when executed by the at least one processor, cause the system to perform operations comprising:
receiving an indication of a selected objective to be pursued by a software-based reinforcement learning (RL) agent in performing actions relating to the updating of software applications installed on a set of client computing devices;
configuring the software-based RL agent to perform the actions subject to a randomly selected first schedule, wherein the actions comprise i) instructing an update agent executing at a client computing device to download a software update, and ii) instructing an update agent executing at a client computing device to install a previously downloaded software update;
invoking the software-based RL agent to perform a first software update procedure for a first software update by performing the actions subject to the randomly selected first schedule;
upon determining a change in a status, calculating a penalty associated with the software-based RL agent completing the first software update procedure for the first software update by performing the actions subject to the randomly selected first schedule;
comparing the penalty to a predetermined threshold; and
upon determining that the penalty exceeds the predetermined threshold, reconfiguring the software-based RL agent to perform actions subject to a second schedule, the actions relating to the updating of software applications executing on the set of client computing devices with a second software update.

11. The system of claim 10, wherein the software-based RL agent is to perform a plurality of software update procedures for a plurality of software updates, wherein actions performed in completing each software update procedure are subject to a new schedule until a penalty calculated for completing a software update procedure subject to a specific schedule is less than the predetermined threshold.

12. The system of claim 10, wherein the instructions, when executed by the at least one processor, cause the system to perform further operations comprising:
causing presentation of a user interface that includes a prompt to select one objective from a plurality of objectives, wherein receiving the indication of the selected objective occurs as a result of an end-user selecting one objective from the plurality of objectives, the plurality of objectives comprising:
a first objective prioritizing speed in completing a software update process;
a second objective prioritizing a minimum impact to network traffic; and
a third objective prioritizing a minimum cost of power consumption.

13. The system of claim 10, wherein determining a change in the status comprises one of:
determining that a software application installed on each client computing device of the set of client computing devices has been updated;
determining that a software application installed on some predetermined percentage of the set of client computing devices has been updated;
determining that some predetermined duration of time has elapsed since the software-based RL agent has been invoked to perform a software update procedure.

14. The system of claim 10, wherein calculating the penalty associated with the software-based RL agent completing the first software update procedure for the first software update by performing the actions subject to the randomly selected first schedule comprises:
calculating the penalty as a weighted combination of metrics, wherein the weighting of the metrics is dependent upon the selected objective.

15. The system of claim 10, wherein calculating the penalty associated with the software-based RL agent completing the first software update procedure for the first software update by performing the actions subject to the randomly selected first schedule comprises:
calculating the penalty as a weighted combination of metrics, wherein one metric in the combination of metrics is derived by multiplying a tariff for electricity by a metric representing a collective amount of power consumed by the set of client computing devices in completing a software update procedure.

16. The system of claim 10, wherein calculating the penalty associated with the software-based RL agent completing the first software update procedure for the first software update by performing the actions subject to the randomly selected first schedule comprises:
calculating the penalty as a weighted combination of metrics, wherein one metric in the combination of metrics represents a percentage of overall traffic observed in a local network that is attributable to the completion of the software update process.

17. The system of claim 10, wherein calculating the penalty associated with the software-based RL agent completing the first software update procedure for the first software update by performing the actions subject to the randomly selected first schedule comprises:
calculating the penalty as a weighted combination of metrics, wherein one metric in the combination of metrics represents an extent to which completions of the software update process disrupted end-user activity at a client computing device.

18. The system of claim 10, wherein calculating the penalty associated with the software-based RL agent completing the first software update procedure for the first software update by performing the actions subject to the randomly selected first schedule comprises:
  calculating the penalty as a weighted combination of metrics, wherein one metric in the combination of metrics represents a score associated with a type of the first software update, the type comprising one of:
  a security software update;
  a quality software update; or
  a feature software update.

19. A system comprising:
  means for receiving an indication of a selected objective to be pursued by a software-based reinforcement learning (RL) agent in performing actions relating to the updating of software applications installed on a set of client computing devices;
  means for configuring the software-based RL agent to perform the actions subject to a randomly selected first schedule, wherein the actions comprise i) instructing an update agent executing at a client computing device to download a software update, and ii) instructing an update agent executing at a client computing device to install a previously downloaded software update;
  means for invoking the software-based RL agent to perform a first software update procedure for a first software update by performing the actions subject to the randomly selected first schedule;
  means for calculating a penalty associated with the software-based RL agent completing the first software update procedure for the first software update by performing the actions subject to the randomly selected first schedule, upon determining a change in a status;
  means for comparing the penalty to a predetermined threshold; and
  means for reconfiguring the software-based RL agent to perform actions subject to a second schedule, the actions relating to the updating of software applications executing on the set of client computing devices with a second software update, upon determining that the penalty exceeds the predetermined threshold.

20. The system of claim 19, wherein the software-based RL agent is to perform a plurality of software update procedures for a plurality of software updates, wherein actions performed in completing each software update procedure are subject to a new schedule until a penalty calculated for completing a software update procedure subject to a specific schedule is less than the predetermined threshold.

* * * * *